US006376161B1

(12) United States Patent
Iwai et al.

(10) Patent No.: US 6,376,161 B1
(45) Date of Patent: Apr. 23, 2002

(54) IMAGE INFORMATION RECORDING METHOD

(75) Inventors: Yoshiko Iwai; Shigeto Hirabayashi, both of Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/799,673

(22) Filed: Mar. 7, 2001

Related U.S. Application Data

(62) Division of application No. 09/217,913, filed on Dec. 22, 1998, now abandoned.

(30) Foreign Application Priority Data

Dec. 25, 1997 (JP) .............................. 9-367254

(51) Int. Cl.[7] .................................. G03C 7/30
(52) U.S. Cl. ..................... 430/362; 430/363; 430/393; 430/430
(58) Field of Search ................................ 430/362, 363, 430/430, 434, 393

(56) References Cited

U.S. PATENT DOCUMENTS

| 5,519,510 A | 5/1996 | Edgar ........................ 358/471 |
| 5,627,016 A | 5/1997 | Manico ....................... 430/434 |
| 5,695,913 A | 12/1997 | Nakamura et al. .......... 430/415 |
| 5,756,269 A | 5/1998 | Ishikawa et al. ............ 430/404 |
| 5,840,470 A | * 11/1998 | Bohan et al. ................ 430/359 |

FOREIGN PATENT DOCUMENTS

| EP | 0 762 201 | 3/1997 |
| EP | 0 800 114 | 10/1997 |
| EP | 0 930 536 | * 7/1999 |

OTHER PUBLICATIONS

European Search Report Jul. 22, 1999.

* cited by examiner

*Primary Examiner*—Hoa Van Le
(74) *Attorney, Agent, or Firm*—Finnegan, Henderson Farabow, Garrett & Dunner, L.L.P.

(57) ABSTRACT

An image information recording method is disclosed. The method comprises the steps of imagewise exposed to light a silver halide photographic light-sensitive material comprising a support having thereon a light-sensitive layer comprising light-sensitive silver halide and a coupler, color developing the image wise exposed silver halide photographic light-sensitive material, converting the image information formed on the silver halide photographic light-sensitive material to electric information while the light-sensitive material is wetted without a drying and at least a part of developed silver is remained in the light-sensitive material, and recording the image information on another recording medium according as electric image information.

5 Claims, No Drawings

IMAGE INFORMATION RECORDING METHOD

This division of application Ser. No. 09/217,913, filed Dec. 22, 1998, now abandoned, which is incorporated herein by reference.

FIELD OF THE INVENTION

This invention relates to an image information recording method, particularly relates to an image information recording method using a silver halide photographic light-sensitive material, hereinafter occasionally referred to a light-sensitive material.

Recently, it is frequently performed to take image information into a personal computer and to utilize the image information after processing by the computer, accompanied with popularization of the personal computer and interment system. A method by photographing using a digital camera is applicable for taking the image information into the personal computer. However, the quality of an image taken by the digital camera is considerably insufficient since the number of pixel of the digital camera is several hundred thousands and about a million at the highest.

On the other hand, a high quality image data with about a ten million pixel can be obtained by reading the image information formed on an usual color photographic light-sensitive material by a scanner even if a single use camera is used. Such the method is also advantageous in that the image information the usual photographic light-sensitive material accumulated for many years. However, in such the method, a problem is raised that a long time is necessary to obtain the image information since two steps of procedure, processing a color light-sensitive material in a photo-shop and reading the image information into a recording medium, are necessary.

Although prior art is described in Japanese Patent Publication Open for Public Inspection (JP O.P.I.) Nos. 9-121265, 9-230557 and 9-281675, and U.S. Pat. No. 5,627,016, such the techniques are insufficient in the image quality and the rapidness.

In JP O.P.I. No. 9-146247, a technique for obtaining image information, in which the light-sensitive material is developed, without bleaching and fixing, and the image formed is read by a scanner to obtain the image information. However, in the method described in this publication, it is considerably difficult to obtain the image information by reading the image by the scanner since the transmission density of the light-sensitive material is considerably increased by the presence of developed silver and silver halide remained in the light-sensitive material after processing.

As prior art in which image information is read before drying process, a photographic. system is described in JP O.P.I. No. 5-100321 in which a negative film is scanned after color developing and before drying to obtain image data. However, the processing disclosed in the publication includes the steps of color developing, bleaching, bleach-fixing and washing, and the scanning is performed during the washing step. Therefore, the method is insufficient in the simpleness and the rapidness of the procedure since the four steps of processing are carried out.

U.S. Pat. No. 5,101,286 discloses a method in which image data are read by an image processor from a negative film after color developing and before bleaching thereof. In the method, the reading is performed after bleaching and before fixing of the light-sensitive material, Accordingly, the level of image quality is insufficient since increasing in the transmission density and an unevenness of image caused by remained silver halide are formed.

SUMMARY OF THE INVENTION

The first object of the invention is to provide an image information recording method by which high quality image information can be obtained simply and rapidly by the use of an usual silver halide color photographic light-sensitive material.

The second object of the invention is to provide an image information recording method by which a high quality image inhibited in the formation of unevenness can be obtained.

The objects of the invention can be attained by an image information recording method comprising the steps of imagewise exposed to light a silver halide photographic light-sensitive material comprising a support having thereon a light-sensitive layer comprising light-sensitive silver halide and a coupler, color developing the image wise exoosed silver halide photographic light-sensitive material, converting the image information formed on the silver halide photographic light-sensitive material to electric information while the light-sensitive material is wetted without a drying and at least a part of developed silver is remained in the light-sensitive material, and recording the image information on another recording medium according as the electric image information.

DETAILED DESCRIPTION OF THE INVENTION

In the technique disclosed in U.S. Pat. No. 5,101,286, a negative film is color developed and bleaching and image data are read by a image processor. In the light-sensitive material to be read, developed silver has removed and silver halide has been remained since the reading is carried out after bleaching and before fixing.

According to studying by the inventors, an unevenness of image caused by silver halide is formed when the light-sensitive material in which silver halide is remained is read, and the level of quality of thus obtained image is insufficient.

It is found by the inventors that the unevenness of image can be prevented when the light-sensitive material is read out by a scanner after the color developing while at least a part of developed silver is remained in the light-sensitive material. It is a surprising fact. It is preferable that the light-sensitive material is scanned without any bleaching process. The bleaching process is a process for oxidizing developed silver remained in a light-sensitive material to silver halide. Moreover, in the case of a part of developed silver is remained in the light-sensitive material at the time of canning, it is found that a better image quality, particularly in graininess, can be obtained when the image is read by a scanner while the light-sensitive material is in a wetted state.

In the invention, although the silver halide may be remained without removing, it is preferable to be removed by 50% or more, and further preferably to be removed by 90% or more. The silver halide can be removed by a fixing or bleach fixing process.

In the invention, the drying process is a process for removing moisture from the processed light-sensitive material. The method for drying includes that by a heating roller or by hot air.

The light-sensitive material in a wetted state is a light-sensitive material containing water or a processing solution in a weight ratio of from 0.1 to 1 of times, preferably 1 time, of the weight of the water or processing solution to be contained in all layers of the light-sensitive material in a state of maximally swelled.

There is no limitation on the kind of silver halide color photographic light-sensitive material to be used in the invention. A color negative film, a color reversal film and a direct positive light-sensitive material are also usable.

The silver halide color photographic material of the invention preferably has a red-sensitive silver halide emulsion layer, a green-sensitive silver halide emulsion layer and a blue-sensitive silver halide emulsion layer each capable of recording red-light, green-light and blue-light, respectively.

The silver halide color photographic material to be used in the invention preferably has a speed of not less than ISO 30, more preferably not less than ISO 100, further preferably not less than 400.

It is a presupposition of the invention that the image information on the developed light-sensitive material is read out by a scanner and the image is processed by a personal computer. However, image information obtained by an usual Processing C-41 with a color developing time of 195 seconds is a processing optimized for outputting an image for an optical printer, and not for obtaining image information suitable for the image processing.

In the reading out by the scanner, a lowered fog and lowered gamma are preferable for reducing the load of scanning.

It has been found by the inventors that image information with a low fog and a low gamma suitable for reading out by the scanner can be obtained by reducing the developing time to shorter than usual time of 195 seconds.

In the invention the color developing time is preferably not more than 180 seconds, more preferably 140 seconds.

In the invention, a developing solution containing a p-phenylenediamine color developing agent may be used.

The temperature of the color developing solution is preferably not less than 40° C., more preferably not less than 40° C.

The concentration of the color developing agent is preferably not less than 0.016 moles per liter, more preferably 0.030 moles per liter.

The pH of the color developing solution is preferably not less than 10.0, more preferably not less than 10.4.

A know method, system and condition including those anther than the above-mentioned can be applied in the invention without any limitation. The light-sensitive material can be developed by jetting, such as an ink-jet development or coating the developing solution in an amount capable of substantially being permeated into the light-sensitive material. There is no limitation on the method for jetting the developing solution. The developing agent may be jetted through a single movable nozzle or through plural fixed nozzles. The developing solution may be jetted through a moving nozzle onto the fixed light-sensitive material or through a fixed nozzle on to the moving light-sensitive material. A combination of such the procedures may also be usable.

When the development is carried out by supplying the developing solution in an amount of capable of being permeated into the light-sensitive material, there is no limitation on the medium conveying the developing solution, and a felt, clothes, and a metal having a slit or hole are preferably usable. A method in which the developing solution is coated on the light-sensitive material by a medium while jetting the developing solution onto the light-sensitive material or the medium.

In the invention, the image information formed on the light-sensitive material is read out by a scanner (a CCD is also may usable) to convert to electric information while the light-sensitive material is in the wetted state.

In the invention, the scanner is a device to convert the reflection or transmission optical density of the light-sensitive material read out by scanning to image information. It is usual to move the optical head of the scanner in the direction different from the moving direction of the light-sensitive material to scan the necessary area of the light-sensitive material. Although such the method is recommendable, it may be allowed to move only the optical head of the scanner while the light-sensitive material is fixed, or to move only the light-sensitive material while the optical head of the scanner is fixed. These procedures may be applied in combination.

A tungsten lamp, a fluorescent lamp, a light emission diode, or a laser may be used as the light source for reading out the image information without any limitation. The tungsten lamp is preferably used in the reason of a low cost and laser, a coherent light source, is preferable since which has a high stability, a high brightness and hardly influenced by scattering. Although there is no limitation on the reading out method, it is preferred to read out by transmission light from the viewpoint of the sharpness of image.

It is preferable that the light-sensitive material contains a color developing agent. The color developing agent to be contained in the light-sensitive material may be a p-phenylene diamine compound or a p-aminophenol compound. Among such the compounds, a compound represented by the following Formulas 1 through 4 or 5 is preferably used.

Formula 1

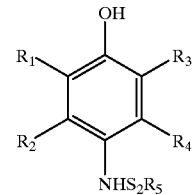

Formula 2

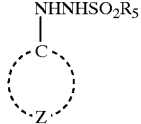

Formula 3

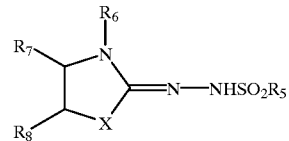

Formula 4

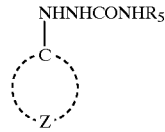

Formula 5

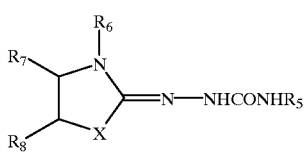

Compounds represented by Formula 1 are ones generally named as sulfonamidophenol compounds. In the formula, $R_1$ to $R_4$ are each a hydrogen atom, a halogen atom such as chlorine atom and a bromine atom, an alkyl group such as a methyl group, an ethyl group, an isopropyl group, an n-butyl group and a t-butyl group, an aryl group such as a phenyl group, a tolyl group and a xylyl group, an alkylarbonamido group such as an acetylamido group, a propionylamino group and a butyloylamino group, an arylcarnonamido group such as a benzoylamino group, an alkylsulfonamido group such as a methanesulfonylamino group and an ethanesulfonylamino, an arylsulfonylamido group such as a benzenesulfonylamino group and toluenesulfonylamino group, an alkoxy group such as a methoxy group, an ethoxy group and a butoxy group, an aryloxy group such as a phenoxy group, an alkylthio group such as methylthio group, an ethylthio group and a butylthio group, an arylthio group such as a phenylthio group and a tolylthio group, an alkylcarbamoyl group such as a methylcarbamoyl group, a dimethylcarbamoyl group, an ethylcarbamoyl group, a diethylcarbamoyl group, a dibutylcarbamoyl group, a piperidylcarbonyl group and a morpholylcarbamoyl group, an arylcarbamoyl group such as a phenylcarbamoyl group, a methylphenylcarbamoyl group, an ethylphenylcarbamoyl group and a benzylphenylcarbamoyl group, a carbamoyl group, an alkylsulfamoyl group such as a methylsulfamoyl group, a dimethylsulfamoyl group, an ethylsulfamoyl group, a diethylsulfamoyl group, a dibutylsulfamoyl group, a piperidylsulfamoyl group and a morpholylaulfamoyl group, an arylsulfamoyl group such as a phenylsulfamoyl group, a methylphenylsulfamoyl group, an ethylphenylsulfamoyl group and a benzylphenylsulfamoyl group, a sulfamoyl group, a cyano group, an alkylsulfonyl group such as a methanesulfonyl group and an ethanesulfonyl group, an arylsulfonyl group such as a phenylsulfonyl group, a 4-chlorophenylsulfonyl group and a p-toluenesulfonyl group, an alkoxycarbonyl group such as a methoxycarbonyl group, an ethoxycarbonyl group and a butoxycarbonyl group, an aryloxycarbonyl group such as a phenoxycarbonyl group, an alkylcarbonyl group such as an acetyl group, a propionyl group and a butyloyl group, an arylcarbonyl group such as a benzoyl group and an alkylbenzoyl group, or an acyloxy group such as an acetyloxy group, a propionyloxy group and a butyloyloxy group. Among $R_1$ to $R_4$, $R_2$ and $R_4$ are each preferably a hydrogen atom. It is preferable that the total of Hammett's constant $\sigma_p$ of the $R_1$ to $R_4$ is preferably not less than 0.

$R_5$ is an alkyl group such as a methyl group, an ethyl group, a butyl group, an octyl group, a lauryl group, a cetyl group and a stearyl group, an aryl group such as a phenyl group, a tolyl group, a xylyl group, a 4-methoxyphenyl group, a dodecyphenyl group, a chlorophenyl group, a trichlorophenyl group, a nitrochlorophenyl group, triisopropylphenyl group, a 4-dodecyloxyphenyl group and a 3,5-di-(methoxycarbonyl)phenyl group, or a heterocyclic group such as a pyridyl group. The alkyl group, aryl group and heterocyclic group represented by $R_5$ each may have a substituent.

Compounds represented by Formula 2 are ones generally named as sulfonylhydrazine compound, and compounds represented by Formula 4 are ones generally named as carbamoylhydrazine compound.

In the formulas, Z is a group of atoms necessary to form an aromatic ring. The aromatic ring formed by Z preferably has sufficient electron-withdrawing ability so as to give a developing ability to the compound. Accordingly, the aromatic ring is preferably a nitrogen-containing aromatic ring or a an aromatic ring such as a benzene ring having an electron-withdrawing group. A pyridine ring, a pyrimidine ring, a quinoline ring and quinoxaline ring are preferred as such the ring. In the case of benzene ring, examples of the substituent thereof includes an alkylsulfonyl group such as a methanesulfonyl group and an ethanesulfonyl group, a halogen atom such as a chlorine atom and a bromine atom, an alkylcarbamoyl group such as a methylcarbamoyl group, a dimethylcarbamoyl group, an ethylcarbamoyl group, a diethyl-carbamoyl group, a dibutylcarbamoyl group, a piperidyl-carbamoyl group and a morpholylcarbamoyl group, an arylcarbamoyl group, such as a phenylcarbamoyl group, a methylphenylcarbamoyl group, an ethylphenylcarbamoyl group and a benzylphenylcarbamoyl group, a carbamoyl group, an alkylsulfamoyl group such as a methylsulfamoyl group, a dimethylsulfamoyl group, an ethylsulfamoyl group, a diethylsulfamoyl group, a dibutylsulfamoyl group, a piperidylsulfamoyl group and a morpholylsulfamoyl group, an arylsulfamoyl group such as a phenylsulfamoyl group, a methylphenylsulfamoyl group, an ethylphenylsulfamoyl group and a benzylphenylsulfamoyl group, a sulfamoyl group, a cyano group, an alkylsulfonylgroup such as a methanesulfdnyl group and an ethanesulfonyl group, an arylsulfonyl group such as a phenylsulfonyl group, a 4-chlorophenylsulfonyl group and a p-toluenesulfonyl group, an alkoxycarbonyl group such as a methoxycarbonyl group, an ethoxycarbonyl group and a butoxycarbonyl group, an aryloxycarbonyl group such as a phenoxycarbonyl group, an alkylcarbonyl group such as an acetyl group, a propionyl group and a butyloyl group, and an arylcarbonyl group such as a benzoyl group and an alkylbenzoyl group. The total of Hammett's constant $\sigma_p$ of the substituents of benzene ring is not less than 1.

Compounds represented by Formula 3 are ones generally named as sulfonylhydrazone, and those represented by Formula 5 are ones generally named as carbamoylhydrazone.

In these Formulas, $R_6$ is an alkyl group such as a methyl group or a ethyl group, which may have a substituent. X is an oxygen atom, a sulfur atom, a selenium atom, a tertiary nitrogen atom substituted by an alkyl group or an aryl group, and one substituted by alkyl group is preferred. $R_7$ and $R_8$ are each a hydrogen atom or a substituent, and $R_7$ and $R_8$ may be, bonded to form a double bond or a ring.

Concrete examples of compound represented by Formula 1 to 4 or 5 are shown below.

D-1 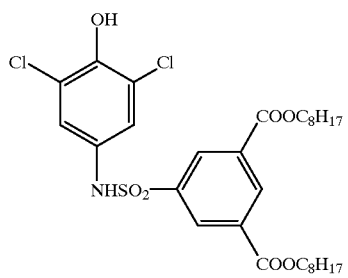 D-2 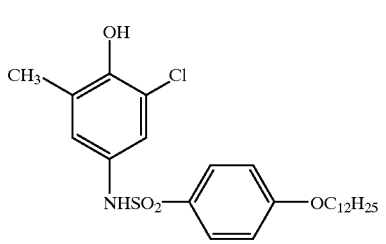
D-3 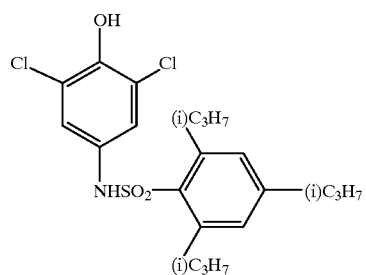 D-4 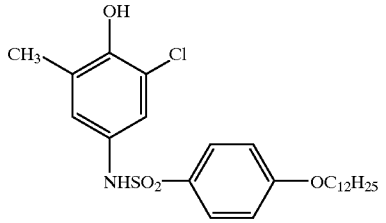
D-5 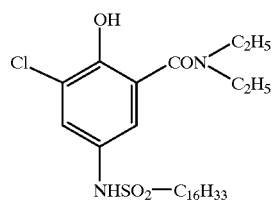 D-6 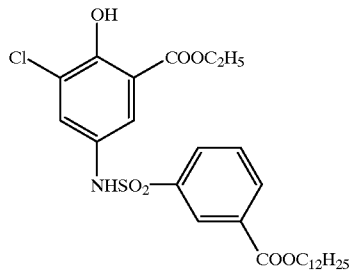
D-7 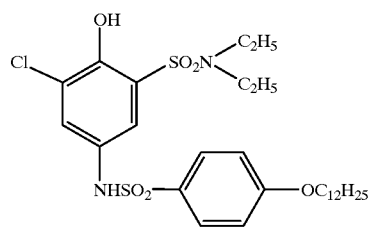 D-8 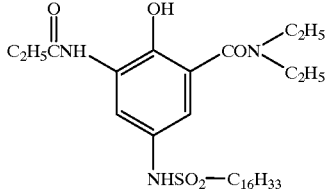
D-9 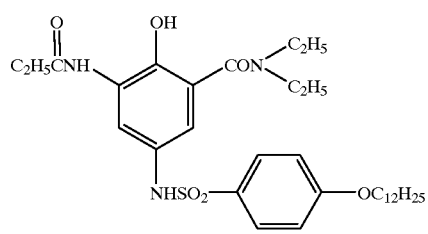 D-10 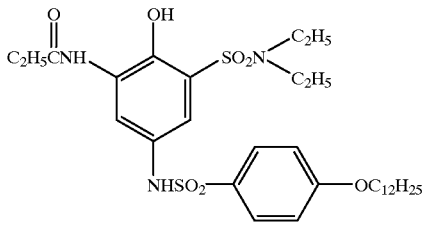
D-11 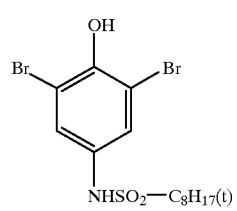 D-12 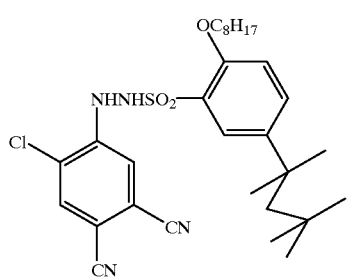

-continued
D-13
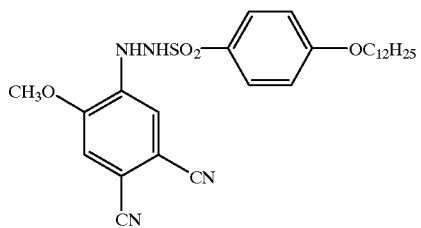
D-14
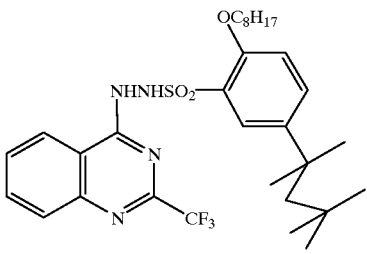
D-15
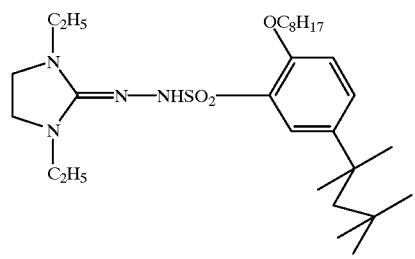
D-16
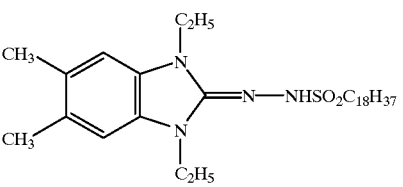
D-17
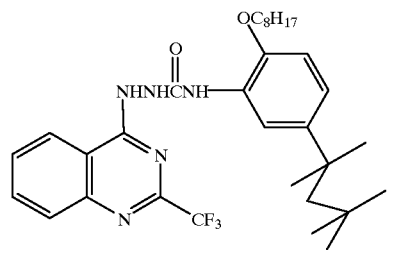
D-18
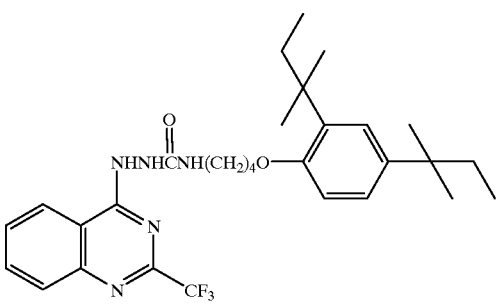
D-19
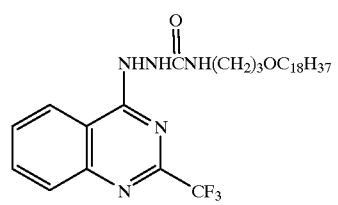
D-20
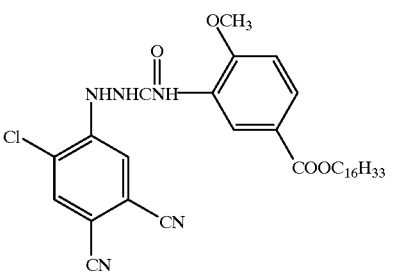
D-21
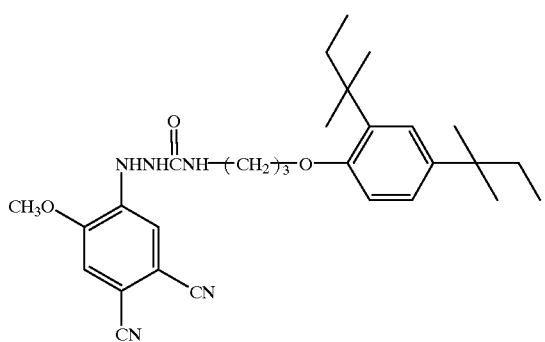
D-22
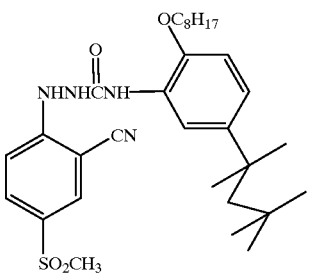

-continued

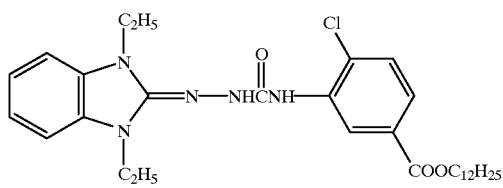
D-23

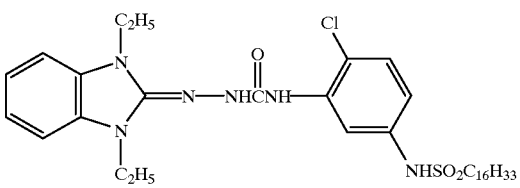
D-24

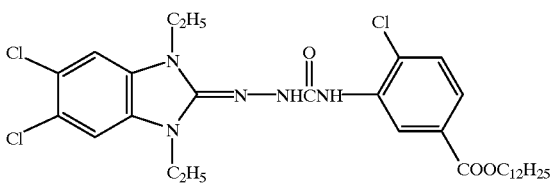
D-25

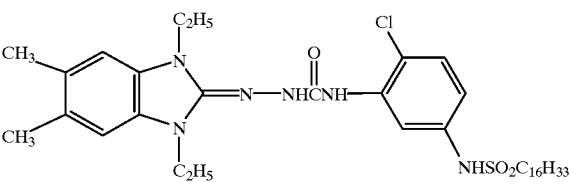
D-26

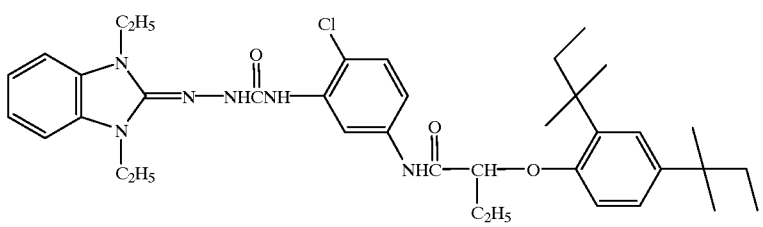
D-27

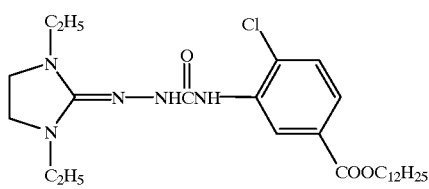
D-28

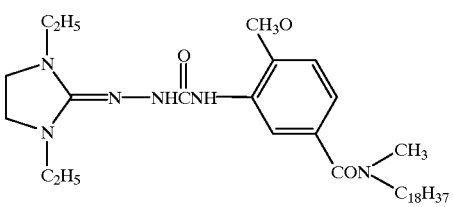
D-29

In the invention, the blue-sensitive silver halide emulsion layer, the green-sensitive silver halide emulsion layer and the red-sensitive silver halide emulsion layer are each a silver halide emulsion layer spectrally sensitized to blue-light, green-light and red-light, respectively. In these layers, a known coupler may be used without any limitation of the kind thereof.

Raw materials usable in the invention are described in known publications. These material can be easily synthesized or available by skilled one referring the publications. Examples of the publications include, for example, JP O.P.I. Nos. 8-166644, 8-202002, 8-286340, 8-262531, 8-227131, 8-292529, 8-234388, 8-234390, 9-34081, 9-75670, 9-114062, 9-152686, 9-152691, 9-152692, 9-152693, 9-152700, 9-152701, 9-159702, 9-159703, 9-150794 and 9-150795.

There is no limitation on the silver halide emulsion to be used in the light-sensitive material to be applied in the invention, and a known silver halide emulsion is usable. There is no limitation on the grain size, aspect ratio, halide composition, namely kind and amount of halogen in silver halide, halide distribution, namely distribution of different kinds of silver halide in the silver halide grain, and the presence of dislocation line of silver halide grain. The size of silver halide grain, in terms of the side length of a cube having the same value, is preferably from 0.05 to 2 μm. The aspect ratio is preferably not less than 4, more preferably not less than 8, particularly preferably not less than 12, from the viewpoint of the sharpness. It is preferable that the halide is mainly composed of silver bromide, and that the silver bromide content is from 80 to 99 mole-%, and that the silver iodide content is from 1 to 20 mole-%.

It is preferable to have a dislocation line from the viewpoint of sensitivity. A silver halide emulsion physically ripened, chemically ripened and spectrally sensitized is usually sued when the light-sensitive material is prepared. Additives to be used in such the process are described in Research Disclosure Nos. 17643, 18716 and 308119, hereinafter referred to RD17643, RD18716 and RD308119.

The pages at which the additives are described are as follows.

| [Item] | [RD308119] | [RD17643] | [RD18716] |
|---|---|---|---|
| Chemical sensitizer | 996 III-A | 23 | 648 |
| Spectral sensitizer | 996 IV-A, B, C, D, H, I, J | 23–24 | 648–9 |
| Super sensitizer | 996 IV-A, E, J | 23–24 | 648–9 |
| Anti-foggant | 998 VI | 24–25 | 649 |
| Stabilizing agent | 998 VI | 24–25 | 649 |

To chemically sensitize the emulsion, a sulfur sensitization using a compound containing sulfur capable of reacting with a silver ion or an active gelatin, a selenium sensitization using a selenium compound, a reduction sensitization using a reducing agent and a noble metal sensitization using a compound of noble atom such as gold may be applied singly or in combination.

A chalcogen sensitizers are usable. Among them, a sulfur sensitizer and a selenium sensitizer are preferable. The sulfur sensitizer include, for example, a thiosulfate, allylthiocarbamide, thiourea, allyl isothiocyanate, cystine, p-trienethiosulfonate and rhodanine.

Other than the above-mentioned, sulfur sensitizers described in U.S. Pat. Nos. 1,574,944, 2,410,689, 2,278,947, 2,728,668, 3,501,313 and 3656955, West German Patent (OLS) No. 1,422,869, and JP O.P.I. Nos. 56-24937 and 55-45016 are usable.

The adding amount of the sulfur sensitizer is usually from $10^{-7}$ to $10^{-1}$ moles per mole of silver halide even though the amount may be changed depending on various factors such as the pH, temperature and size of silver halide grain.

As the selenium sensitizer, an aliphatic isoselenocyanate such as allyl isoselenocyanate, a selenourea, and a selenide such as selenoselenide and diethyl selenide, are usable. Concrete examples are described in U.S. Pat. Nos. 1,574,944, 1,602,592 and 1,623,499. A reducing sensitizer may further be used in combination.

Stannous chloride, thiourea dioxide, a hydrazine and a polyamine may be used as the reducing sensitizer. A noble metal compound other than gold such as a palladium compound is also usable in combination.

Silver halide grains of the emulsion to be used in the invention is preferably sensitized by a gold compound.

Various kinds of gold. compound including compounds of mono-valent gold and those of tri-valent gold, are preferably usable.

Typical example includes potassium chloroaurate, auric trichloride, potassium aurothiocyanate, potassium iodoaurate, tetracyanoauric acid, ammonium aurothiocyanate, pyridyltrichlorogold, gold sulfide and gold selenide.

The adding amount of the gold compound is usually from $10^{-6}$ moles to $10^{-1}$ moles, preferably from $10^{-7}$ moles to $10^{-2}$ moles, per mole of silver halide, even though the amount may be changed depending on the various conditions.

Such the compounds may be added at any process of the formation of silver halide grain, the physical ripening and the chemical ripening and after the chemical ripening.

Known photographic additives usable in the invention are also described in the foregoing Research Disclosure.

The portion of Research Disclosure relates to the additives are as follows.

| [Item] | [RD308119] | [RD17643] | [RD18716] |
|---|---|---|---|
| Color contamination preventing agent | 1002 VII-I | 25 | 650 |
| Dye image stabilizer | 1001 VII-J | 25 | |
| Whitening agent | 998 V | 24 | |
| UV absorbent | 1003 VIII-C XIIIC | 25–26 | |
| Light scattering agent | 1003 VIII | | |
| Binder | 1003 IX | 26 | 651 |
| Anti-static agent | 1006 XIII | 27 | 650 |
| Hardener | 1004 X | 26 | 651 |
| Plasticizer | 1006 XII | 27 | 650 |
| Lubricant | 1006 XII | 27 | 650 |
| Surfactant, coating aid | 1005 XI | 26–27 | 650 |
| Matting agent | 1007 XVI | | |
| Developing agent | 1011 XXB | | |

A compound capable of fixing formaldehyde by reacting with it, is preferably add to prevent degradation in photographic properties caused by formaldehyde gas, which is described in U.S. Pat. Nos. 4,411,987 and 4,435,503.

Various kinds of dye-forming coupler may be used, and concrete examples of that are described in patent publications given Research Disclosure No. 17643, VII-C to G.

For example, couplers described in the following publications are preferable: U.S. Pat. Nos. 3,933,051, 4,022,620, 4,326,024, 4,401,752 and 4,248,961, Japanese Patent No. 58-10739, British Patent Nos. 1,425,020 and 1,476,760, U.S. Pat. Nos. 3,973,968, 4,314,023 and 4,511,649, and European Patent No. 279,473A.

Preferable examples of 5-pyrazolone type compounds and pyrazoloazole type compounds are described in U.S. Pat. Nos. 4,310,619 and 4,351,897, European Patent No. 73,636, U.S. Pat. Nos. 3,061,432 and 3,725,067, Research Disclosure No. 24220 (June 1984), JP O.P.I. No. 60-33552, Research Disclosure No. 24230 (June 1984), JP O.P.I. Nos. 60-43659, 61-72238, 60-35730, 55-118034 and 60-185951, U.S. Pat. Nos. 4,500,630, 4,540,654 and 4,556,630, and International Patent WO88/04795.

Preferable examples of phenol type and naphthol type couplers are described in U.S. Pat. Nos. 4,052,212, 4,146,396, 4,228,233, 4,296,200, 2,369,929, 2,801,171, 2,772,162, 2,895,826, 2,772,002, 3,758,308, 4,334,011 and 4,327,173, West German Patent OLS No. 3,329,726, European Patent Nos. 121,365A and 249,453A, U.S. Pat. Nos. 3,446,622, 4,333,999, 4,775,616, 4,451,559, 4,427,767, 4,690,889, 4,254,212 and 4,296,199, and JP O.P.I. No. 61-42658.

A colored coupler may be used to compensate an unnecessary absorption of formed dye. Colored couplers described in Research Disclosure No. 17643, VII-G, U.S. Pat. Nos. 4,163,670, Japanese Patent No. 57-39413, U.S. Pat. Nos. 4,004,929 and 4,138,258, British Patent No. 1,146,368 are preferable. A coupler described in U.S. Pat. 4,774,181 which compensates unnecessary absorption of formed dye by a fluorescent dye released upon coupling reaction, and a coupler described in U.S. Pat. No. 4,777,120 which has a dye precursor group capable of forming a dye by reacting with a developing agent, are preferably used.

Typical examples of polymerized dye-forming coupler are described in U.S. Pat. Nos. 3,451,820, 4,080,211, 4,367,282, 4,409,320 and 4,576,910, and British Patent 2,102,173.

A coupler capable of releasing a photographically useful residue upon coupling reaction is also preferably used. Preferable DIR couplers releasing a photographic inhibitor are described in the fore going RD17643, VII-F, JP O.P.I. Nos. 57-151944, 57-154234, 60-184248 and 63-37346, and U.S. Pat. Nos. 4,248,962 and 4,782,012.

As a coupler capable of imagewise releasing a nucleation agent or a development accelerating agent, ones described in British Patent Nos. 2,097,140 and 2,131,188, and JP O.P.I. Nos. 59-157638 and 59-170840 are usable.

Moreover, couplers usable in the invention include a competing coupler described in U.S. Pat. 4,130,427, a polyequivalent coupler described in U.S. Pat. Nos. 4,283, 427, 4,338,393 and 4,310,618, a DIR redox compound releasing coupler described in JP O.P.I. Nos. 60-185950 and 62-24252, a DIR coupler releasing coupler, a DIR coupler releasing redox compound, a DIR redox compound releasing redox compound, a coupler described in European Patent No. 173,302A which releases a dye capable of recoloring after releasing, a bleaching agent releasing coupler described in RD11440, RD24241, and JP O.P.I. No. 61-201247, a ligand releasing coupler described in U.S. Pat. No. 4,553,477, a leuco dye releasing coupler described in JP O.P.I. No. 63-75747, and a fluorescent dye releasing coupler described in U.S. Pat. No. 4,774,181.

In the invention, various couplers may further be used. Examples of such the coupler are described in the following portion of Research Disclosure.

| [Item] | RD308119 | RD17643 |
|---|---|---|
| Yellow coupler | 1001 VII-D | VII C to G |
| Magenta coupler | 1001 VII-D | VII C to G |
| Cyan coupler | 1001 VII-D | VII C to G |
| Colored coupler | 1002 VII-G | VII G |
| DIR coupler | 1001 VII-F | VII F |
| BAR coupler | 1002 VII-F | |
| Useful residue releasing coupler other than the above | 1001 VII F | |

The additives can be added according to a dispersion method described in RD308119, XIV.

In the invention, a support described in RD17643, page 647 to 648, and RD308119 XIX can be used.

In the light-sensitive material, an assistance layer such as a filter layer or an interlayer described in RD308119 VII-K may be provided.

The pH value of the outermost surface of the photographic layer of the light-sensitive material is preferably from 5.0 to 7.0, more preferably from 5.5 to 6.5. The pH value can be measured by the method described in JP O.P.I. 61-245153.

A polyethylene phthalate film and a cellulose triacetate film are preferably used as the support. The thickness of the support is usually from 50 to 200 $\mu$m.

It is preferable that the light-sensitive material is packed in a cartridge, when the light-sensitive material is used in a form of roll.

EXAMPLES

Example 1

A multilayer color light-sensitive material sample was prepared by coating the following compositions on a subbed cellulose triacetate film support.

In the followings, the amount of each of components in the silver halide photographic light-sensitive material is described in terms of mg per square meter except when a specific description is attached. The amounts of silver halide and colloidal silver are each described in terms of silver, and the amount of sensitizing dye is described in moles per mole of silver halide.

| First layer: Antihalation layer | |
|---|---|
| Black colloidal layer | 0.18 |
| UV absorbent (UV-1) | 0.30 |
| High-boiling solvent (Oil-1) | 0.37 |
| Gelatin | 1.59 |
| Second layer: Interlayer | |
| Gelatin | 0.80 |
| Third layer: Low-speed red-sensitive layer | |
| Silver iodobromide emulsion A | 0.63 |
| Sensitizing dye (SD-1) | $1.7 \times 10^{-4}$ |
| Sensitizing dye (SD-2) | $1.5 \times 10^{-4}$ |
| Sensitizing dye (SD-3) | $1.5 \times 10^{-4}$ |
| Sensitizing dye (SD-4) | $1.3 \times 10^{-5}$ |
| Cyan coupler (C-1) | 0.71 |
| Colored cyan coupler (CC-1) | 0.09 |
| DIR compound (D-2) | 0.005 |
| High-boiling solvent (Oil-1) | 0.65 |
| Gelatin | 2.05 |
| Fourth layer: Medium-speed red-sensitive layer | |
| Silver iodobromide emulsion B | 0.71 |
| Sensitizing dye (SD-2) | $2.5 \times 10^{-4}$ |
| Sensitizing dye (SD-3) | $1.4 \times 10^{-5}$ |
| Sensitizing dye (SD-4) | $2.2 \times 10^{-4}$ |
| Cyan coupler (C-1) | 0.27 |
| Colored cyan coupler (CC-1) | 0.04 |
| DIR compound (D-1) | 0.01 |
| High-boiling solvent (Oil-1) | 0.32 |
| Gelatin | 0.83 |
| Fifth layer: High-speed red-sensitive layer | |
| Silver iodobromide emulsion C | 1.52 |
| Sensitizing dye (SD-2) | $2.1 \times 10^{-4}$ |
| Sensitizing dye (SD-3) | $1.2 \times 10^{-5}$ |
| Sensitizing dye (SD-4) | $1.8 \times 10^{-4}$ |
| Cyan coupler (C-2) | 0.13 |
| DIR compound (D-2) | 0.009 |
| High-boiling solvent (Oil-1) | 0.17 |
| Gelatin | 1.04 |
| Sixth layer: Interlayer | |
| Color stain preventing agent (SC-1) | 0.04 |
| High boiling solvent (Oil-1) | 0.50 |
| Gelatin | 1.00 |
| Y-1 | 0.04 |
| Y-2 | 0.12 |
| Seventh layer: Low-speed green sensitive layer | |
| Silver iodobromide emulsion A | 0.76 |
| Sensitizing dye (SD-1) | $6.5 \times 10^{-4}$ |
| Sensitizing dye (SD-9) | $7.2 \times 10^{-5}$ |
| Sensitizing dye (SD-7) | $7.5 \times 10^{-5}$ |
| Magenta coupler (M-1) | 0.13 |
| Colored magenta coupler (CM-1) | 0.11 |
| DIR compound (D-1) | 0.004 |
| High-boiling solvent (Oil-2) | 0.49 |
| Gelatin | 1.10 |
| Eighth layer: Medium-speed green-sensitive layer | |
| Silver iodobromide emulsion B | 0.55 |
| Sensitizing dye (SD-1) | $5.2 \times 10^{-4}$ |
| Sensitizing dye (SD-9) | $5.8 \times 10^{-5}$ |
| Sensitizing dye (SD-7) | $5.0 \times 10^{-5}$ |
| Magenta coupler (M-1) | 0.07 |
| Colored magenta coupler (CM-1) | 0.14 |
| DIR compound (D-3) | 0.002 |
| DIR compound (D-4) | 0.002 |
| High-boiling solvent (Oil-2) | 0.33 |
| Gelatin | 0.78 |
| Ninth layer: High-speed green-sensitive layer | |
| Silver iodobromide emulsion C | 0.82 |
| Sensitizing dye (SD-6) | $1.4 \times 10^{-4}$ |
| Sensitizing dye (SD-7) | $1.5 \times 10^{-4}$ |
| Sensitizing dye (SD-8) | $1.4 \times 10^{-4}$ |
| Magenta coupler (M-1) | 0.03 |
| Magenta coupler (M-2) | 0.05 |
| Colored magenta coupler (CM-2) | 0.03 |
| High-boiling solvent (Oil-2) | 0.31 |
| Gelatin | 0.91 |

-continued

Tenth layer: Interlayer

| | |
|---|---|
| High-boiling solvent (Oil-1) | 0.30 |
| Gelatin | 0.50 |

Eleventh layer: Yellow filter layer

| | |
|---|---|
| Yellow colloidal silver | 0.10 |
| Color stain preventing agent (SC-2) | 0.08 |
| High-boiling solvent (Oil-2) | 0.10 |
| Gelatin | 1.00 |

Twelfth layer: Interlayer

| | |
|---|---|
| Gelatin | 0.50 |

Thirteenth layer: Low-speed blue-sensitive layer

| | |
|---|---|
| Silver iodobromide emulsion A | 0.16 |
| Silver iodobromide emulsion D | 0.16 |
| Sensitizing dye (SD-10) | $1.7 \times 10^{-4}$ |
| Sensitizing dye (SD-11) | $4.0 \times 10^{-4}$ |
| Sensitizing dye (SD'-1) | $3.1 \times 10^{-6}$ |
| Yellow coupler (Y-1) | 0.24 |
| Yellow coupler (Y-2) | 0.66 |
| DIR compound (D-5) | 0.10 |
| High-boiling solvent (Oil-2) | 0.18 |
| Gelatin | 1.19 |

Fourteenth layer: Medium-speed blue-sensitive layer

| | |
|---|---|
| Silver iodobromide emulsion B | 0.46 |
| Sensitizing dye (SD-10) | $1.3 \times 10^{-4}$ |
| Sensitizing dye (SD-11) | $3.0 \times 10^{-4}$ |
| Sensitizing dye (SD'-1) | $1.6 \times 10^{-6}$ |
| Yellow coupler (Y-1) | 0.07 |
| Yellow coupler (Y-2) | 0.20 |
| High-boiling solvent (Oil-2) | 0.05 |
| Gelatin | 0.84 |

Fifteenth layer: High-speed blue-sensitive layer

| | |
|---|---|
| Silver iodobromide emulsion E | 0.41 |
| Sensitizing dye (SD-10) | $0.9 \times 10^{-4}$ |
| Sensitizing dye (SD-12) | $2.0 \times 10^{-4}$ |
| Sensitizing dye (SD'-1) | $1.0 \times 10^{-6}$ |
| Yellow coupler (Y-1) | 0.06 |
| Yellow coupler (Y-2) | 0.18 |
| High-boiling solvent (Oil-2) | 0.05 |
| Gelatin | 0.97 |

Sixteenth layer: First protective layer

| | |
|---|---|
| Silver iodobromide emulsion (Average grain diameter: 0.04 μm, silver iodide content: 4.0 mole-%) | 0.30 |
| UV absorbent (UV-2) | 0.30 |
| UV absorbent (UV-3) | 0.015 |
| UV absorbent (UV-4) | 0.015 |
| UV absorbent (UV-5) | 0.015 |
| UV absorbent (UV-6) | 0.10 |
| High-boiling solvent (Oil-2) | 0.07 |
| High-boiling solvent (Oil-3) | 0.07 |
| Gelatin | 1.44 |

Seventeenth Layer: Second protective layer

| | |
|---|---|
| Alkali-soluble matting agent (P-1) | 0.15 |
| Poly (methyl methacrylate) (Average diameter: 3 μm) | 0.04 |
| Lubricant (WAX-1) | 0.04 |
| Gelatin | 0.55 |

Other than the above-mentioned, compounds SU-1, SU-2, SU-3 and SU-4, viscosity controlling agent V-1, hardeners H-1 and H-2, antifoggants AF-1, AF-2 and two kinds of AF-3 each having a weight average molecular weight of 10,000 and 1,100,000, compounds FS-1 and FS-2 and antiseptic agent DI-1 are optionally added to each layer. The structures of the compounds used in the sample are shown below.

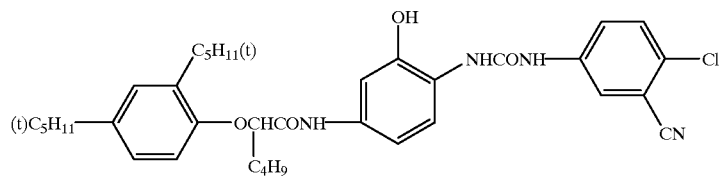

C-1

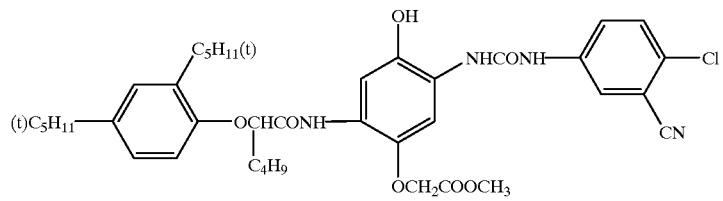

C-2

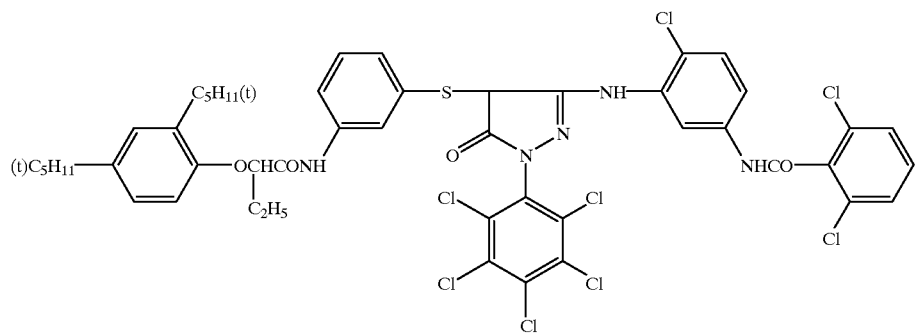

M-1

-continued
M-2
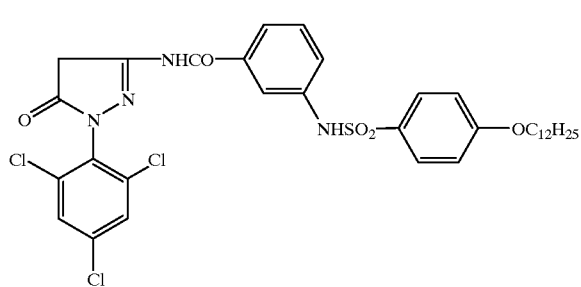
Y-1
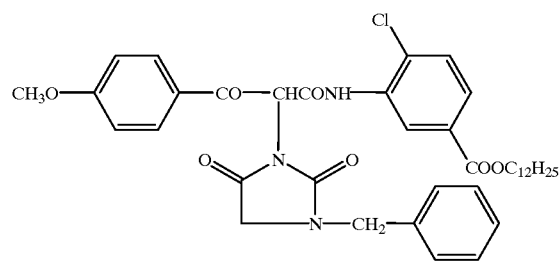
Y-2
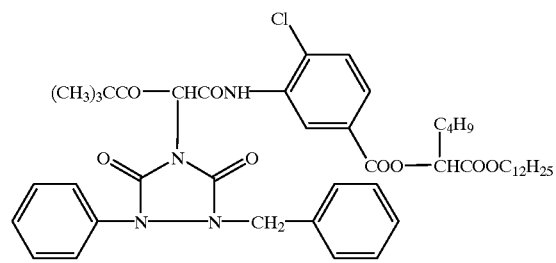
CC-1
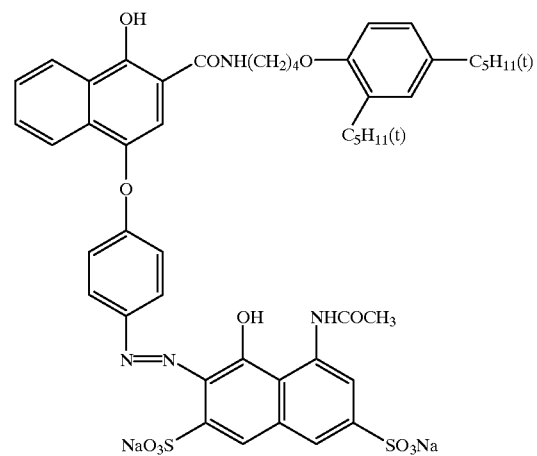
CM-1
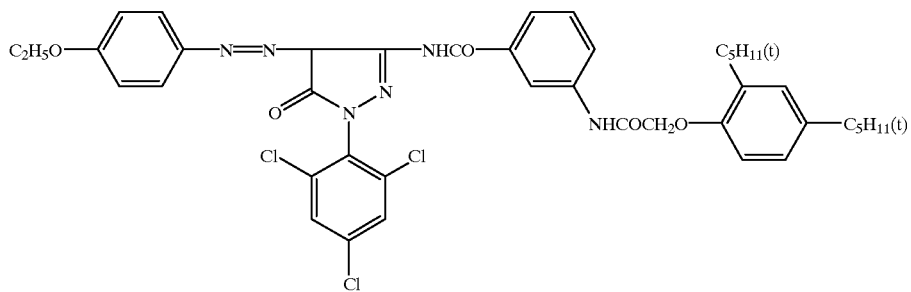
CM-2
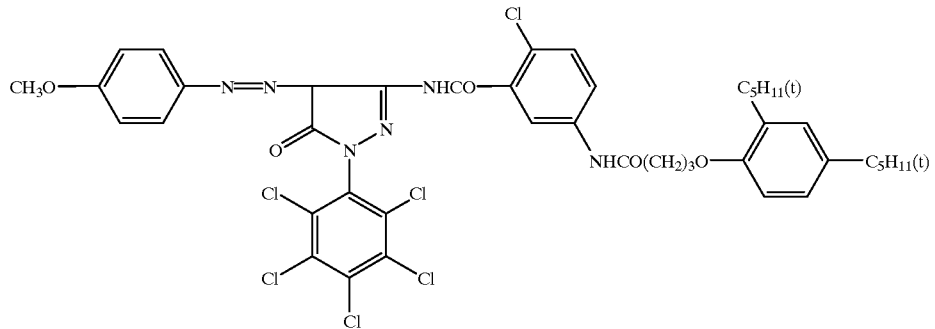

-continued
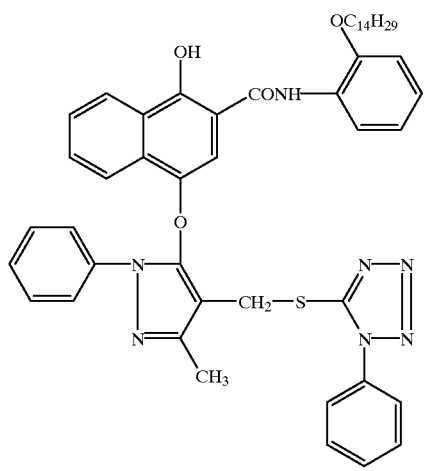
D-1
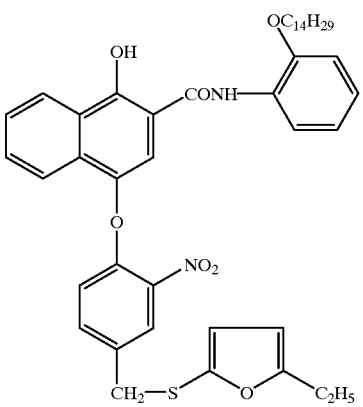
D-2
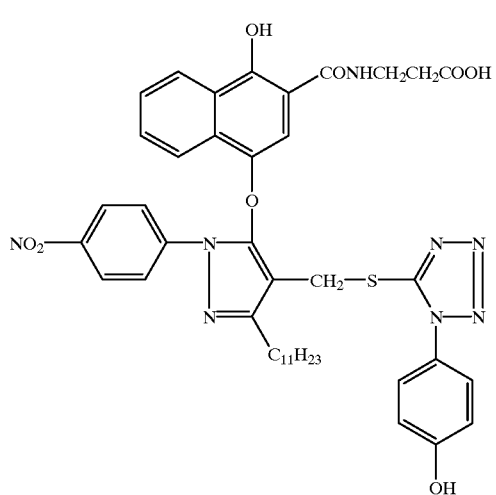
D-3
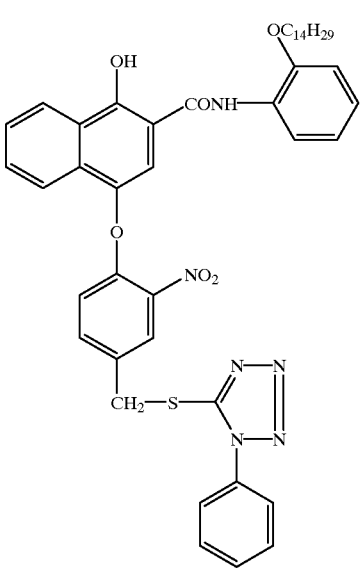
D-4
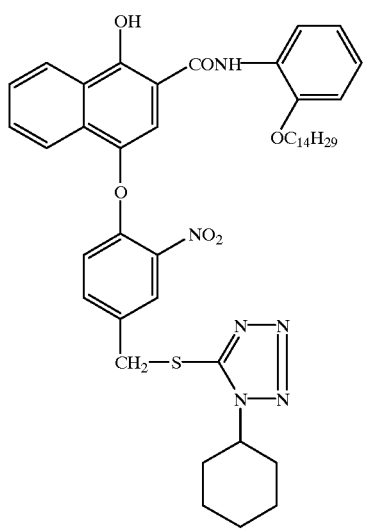
D-5
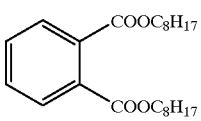
Oil-1

-continued
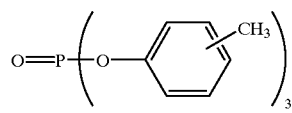
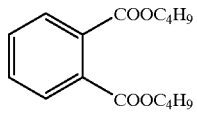
Oil-2  Oil-3
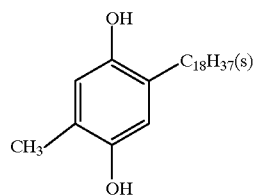
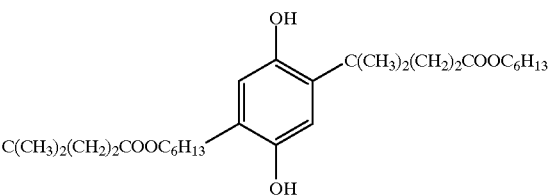
SC-1  SC-2
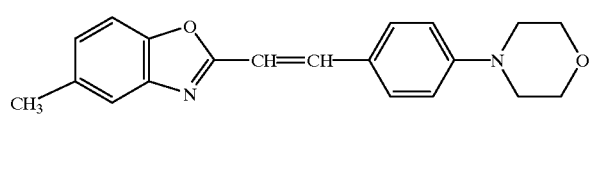
SD'-1
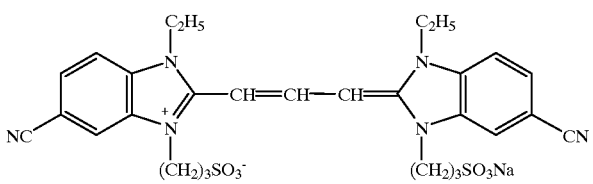
SD-1
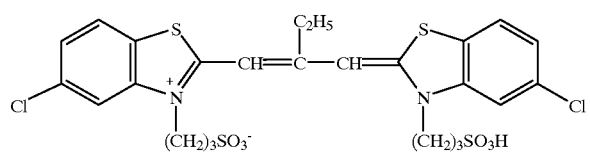
SD-2
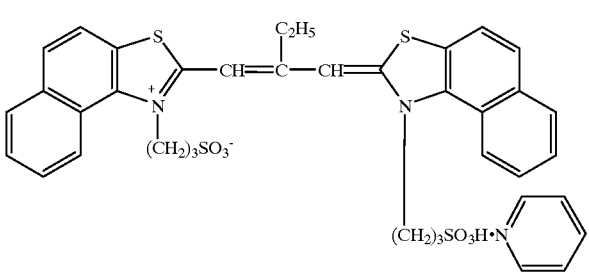
SD-3
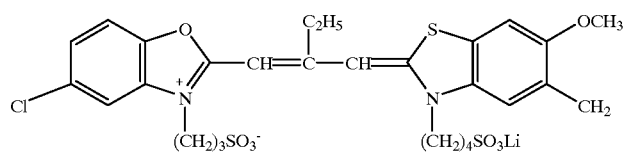
SD-4
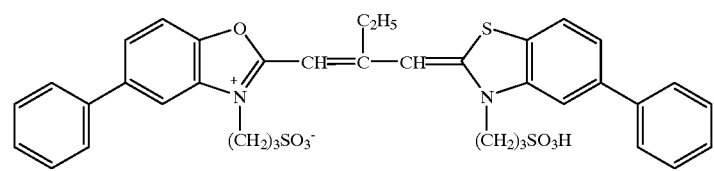
SD-6
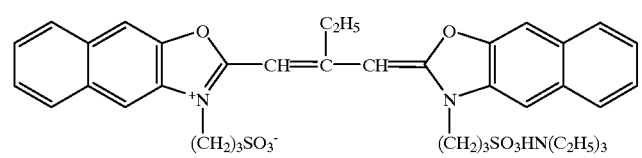
SD-7
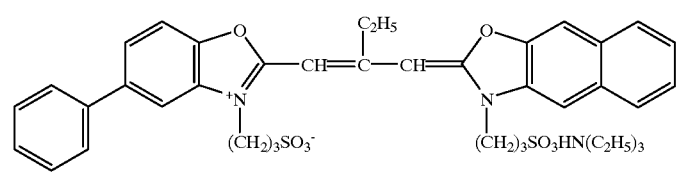
SD-8

-continued
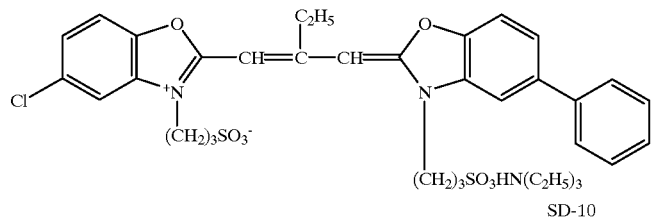
SD-9
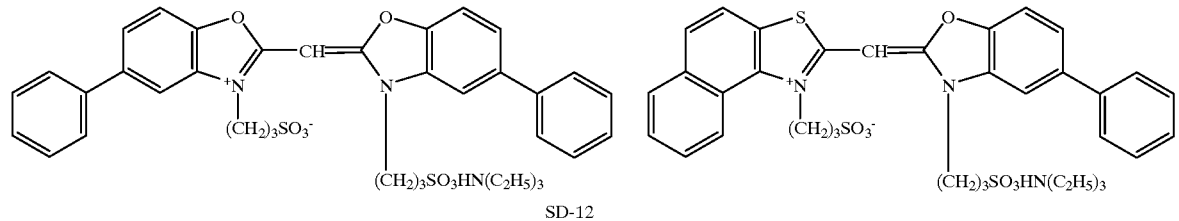
SD-10 SD-11
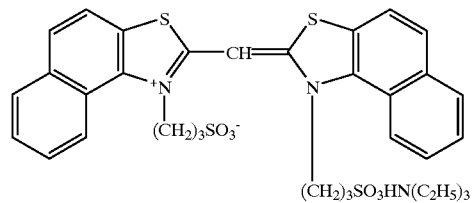
SD-12
| UV absorbent |
|---|
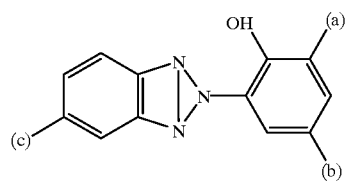
| | (a) | (b) | (c) |
|---|---|---|---|
| UV-1 | —$C_{12}H_{25}$ | —$CH_3$ | —H |
| UV-2 | —H | -(t)$C_4H_9$ | —H |
| UV-3 | -(t)$C_4H_9$ | -(t)$C_4H_9$ | —H |
| UV-4 | -(t)$C_4H_9$ | —$CH_3$ | —Cl |
| UV-5 | -(t)$C_4H_9$ | -(t)$C_4H_9$ | —Cl |
| UV-6 | | | |
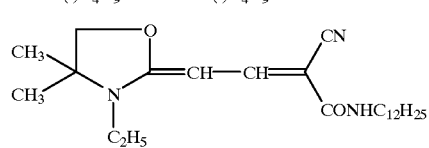
-continued
| UV absorbent |
|---|
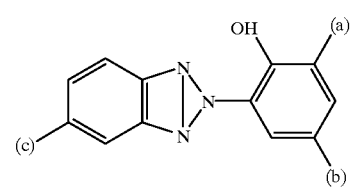
| (a) | (b) | (c) |
|---|---|---|
| WAX-1 | | |
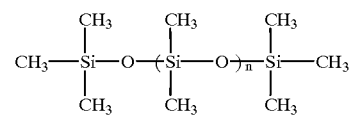
Weight average molecular weight: 3,000

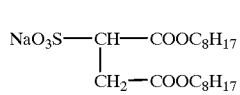 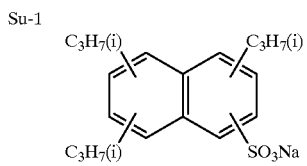 Su-1 Su-2
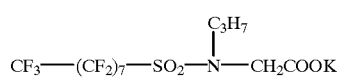 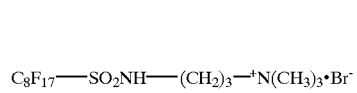 Su-3 Su-4
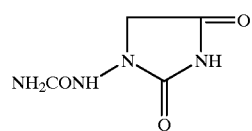 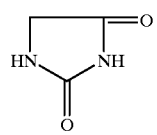 FS-1 FS-2
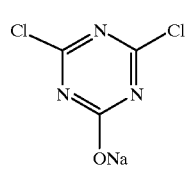 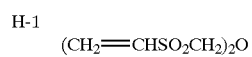 H-1 H-2
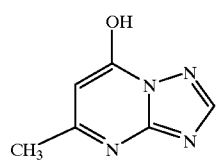 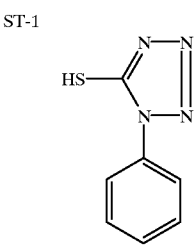 ST-1 AF-1
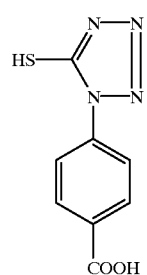 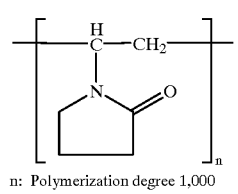 AF-2 AF-3
n: Polymerization degree 1,000
DI-1
(Mixture of the following three components)
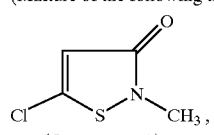 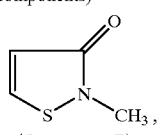 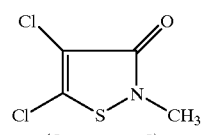
(Component A)  (Component B)  (Component C)
Component A: Component B: Component C = 50 : 46 : 4 in molar ratio
AI-1
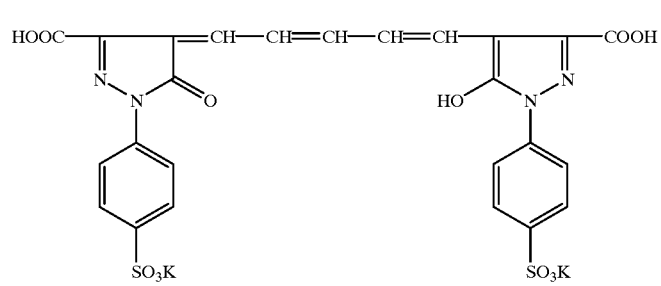

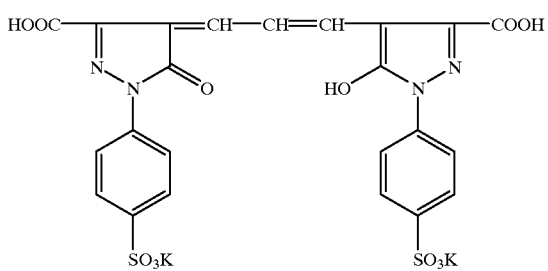

AI-2

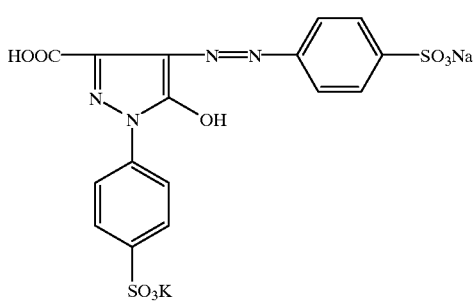

AI-3

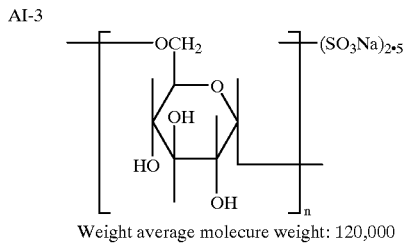

V-1

Weight average molecure weight: 120,000

The emulsions used in the example were followings. The average grain diameter is described in terms of the diameter of cube. Each of the emulsions were optimally sensitized by sulfur-gold sensitization.

TABLE 1

| Emulsion | Average AgI content (mole-%) | Average grain diameter ($\mu$m) | Thickness ($\mu$m) | Crystal habit | Ratio of diameter/ thickness |
|---|---|---|---|---|---|
| Silver iodobromide emulsion A | 8.0 | 0.42 | — | Regular | 1 |
| Silver iodobromide emulsion B | 8.0 | 0.55 | 0.138 | Twinned tabular | 4.0 |
| Silver iodobromide emulsion C | 8.0 | 0.75 | 0.107 | Twinned tabular | 7.0 |
| Silver iodobromide emulsion E | 8.0 | 0.90 | 0.127 | Twinned tabular | 7.1 |

Thus prepared sample 1 was slit in a size 135 negative film and perforated. The sample was put in a camera and a human and a Macbeth Chart were photographed by the sample. The sample exposed was processed under the later-mentioned Conditions 1 to as shown in Table 2. The processing condition 8 to 11 were the same as processing 4 to 7, respectively, except that a drying step for 1 minute 30 seconds at 60° C. was continued after the fixing or bleach-fixing step each of the processing.

Processing 1 (Comparative Example)

| Process | Temperature (° C.) | Time |
|---|---|---|
| Color developing 1 | 38.0 | 3 min. 5 sec. |
| Stopping | 38.0 | 30 sec. |
| Washing | 38.0 | 1 min. |
| Drying | 60.0 | 1 min. 30 sec. |
| Total | | 6 min. 5 sec. |

Processing 2 (Comparative Example)

| Process | Temperature (° C.) | Time |
|---|---|---|
| Color developing 1 | 38.0 | 3 min. 15 sec. |
| Bleaching | 38.0 | 1 min. |
| Bleach-fixing | 38.0 | 3 min. 15 sec. |
| Washing | 25.0 | 50 sec. |
| Total | | 8 min. 20 sec. |

Processing 3 (Comparative Example)

| Process | Temperature (° C.) | Time |
|---|---|---|
| Color developing 1 | 38.0 | 3 min. 15 sec. |
| Bleaching | 38.0 | 45 sec. |
| Total | | 4 min. |

Processing 4

| Process | Temperature (° C.) | Time |
|---|---|---|
| Color developing 1 | 38.0 | 2 min. 10 sec. |
| Fixing | 38.0 | 30 sec. |
| Total | | 2 min. 40 sec. |

Processing 5

| Process | Temperature (° C.) | Time |
|---|---|---|
| Color developing 1 | 38.0 | 2 min. 10 sec. |
| Bleach-fixing | 38.0 | 15 sec. |
| Total | | 2 min. 25 sec. |

Processing 6

| Process | Temperature (° C.) | Time |
|---|---|---|
| Color developing 2 | 42.0 | 45 sec. |
| Fixing | 38.0 | 30 sec. |
| Total | | 1 min. 15 sec. |

Processing 7

| Process | Temperature (° C.) | Time |
|---|---|---|
| Color developing 2 | 42.0 | 45 sec. |
| Bleach-fixing | 38.0 | 10 sec. |
| Total | | 55 sec. |

Composition of each of the processing solutions is shown below.
<Preparation of Processing Solution>
(Color Developing Solution 1)

| | |
|---|---|
| Water | 800 ml |
| Potassium carbonate | 30 g |
| Sodium hydrogen carbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-amino-3-methyl-N-ethyl-N-(β-hydroxyethyl)-aniline sulfate | 4.5 g |
| Diethylenetetraminepentaacetic acid | 3.0 g |
| Potassium hydroxide | 1.2 g |
| Water to make | 1.0 l |

Adjust pH to 10.06 using potassium hydroxide or 20% sulfuric acid.
(Color Developing Solution 2)

| | |
|---|---|
| Water | 800 ml |
| Potassium carbonate | 30 g |
| Sodium hydrogen carbonate | 2.5 g |
| Potassium sulfite | 3.0 g |
| Sodium bromide | 1.3 g |
| Potassium iodide | 1.2 mg |
| Hydroxylamine sulfate | 2.5 g |
| Sodium chloride | 0.6 g |
| 4-amino-3-methyl-N-ethyl-N-(β-hydroxyethyl)-aniline sulfate | 10.0 g (0.035 moles) |
| Diethylenetetraminepentaacetic acid | 3.0 g |
| Potassium hydroxide | 1.2 g |
| Water to make | 1.0 l |

Adjust pH to 10.9 using potassium hydroxide or 20% sulfuric acid.
(Bleaching Solution)

| | |
|---|---|
| Water | 800 ml |
| Ferric ammonium 1,3-diaminopropanepentaacetate | 125 g |
| Ethylenediaminetetraacetic acid | 2 g |
| Sodium nitrate | 40 g |
| Ammonium bromide | 150 g |
| Glacial acetic acid | 40 g |
| Water to make | 1.0 l |

Adjust pH to 4.4 using ammonia water or glacial acetic acid.
(Fixing Solution)

| | |
|---|---|
| Water | 800 ml |
| Ammonium thiocyanate | 120 g |
| Ammonium thiosulfate | 150 g |
| Sodium sulfite | 15 g |
| Ethylenediaminetetraacetic acid | 2 g |
| Water to make | 1.0 l |

(Bleach-fixing Solution)

| | |
|---|---|
| Ferric ammonium diethylenetriaminepentaacetate dihydrate | 100 g |
| Diethylenetriaminepentaacetic acid | 3 g |
| Ammonium thiosulfate (70% aqueous solution) | 200 ml |
| 2-amino-5-mercato-1,3,4-thiadiazole | 2.0 g |
| Ammonium sulfite (40% aqueous solution) | 50 ml |
| Water to make | 1.0 l |

Adjust pH of tank solution to 7.0 and that of replenishing solution to 6.5 using potassium carbonate or glacial acetic acid.

Thus formed image information was read by a film scanner DUO-SCAN, manufactured by Agfa Co., Ltd. The image information was processed on a personal computer and printed out by a printer PM-700C, manufactured by Epson Co., Ltd. The graininess of thus obtained picture was visually evaluated and classified to four ranks as follows.

A: Excellent

B: Good

C: Slightly poor

D: Poor

Obtained results are shown in Table 2.

TABLE 2

| | Processing | | | | |
|---|---|---|---|---|---|
| Experiment No. | Processing No. | Bleach-ing | Drying | Total time | Graini-ness |
| 1 (Comparative) | 1 | Without | With | 6'5" | D |
| 2 (Comparative) | 2 | With | Without | 8'20" | B |
| 3 (Comparative) | 3 | With | Without | 4' | C* |
| 4 (Example) | 4 | Without | Without | 2'40" | A |
| 5 (Example) | 5 | Without | Without | 2'25" | A |
| 6 (Example) | 6 | Without | Without | 1'15" | A |
| 7 | 7 | Without | Without | 55" | A |

TABLE 2-continued

| Experiment No. | Processing No. | Bleaching | Drying | Total time | Graininess |
|---|---|---|---|---|---|
| (Example) | | | | | |
| 8 | 4 | Without | With | 4'10" | B |
| (Comparative) | | | | | |
| 9 | 5 | Without | With | 3'55" | B |
| (Comparative) | | | | | |
| 10 | 6 | Without | With | 2'45" | B |
| (Comparative) | | | | | |
| 11 | 7 | Without | With | 2'25" | B |
| (Comparative) | | | | | |

*Image including unevenness

Moreover, the removed ratio of silver halide and remained ratio of developed silver in the processed samples were determined. Results are listed in the following Table 3. The remained amount of developed silver is described in the relative value when the amount in sample 1 was set at 100.

TABLE 3

| Experiment No. | Removed ratio of silver halide (%) | Remained amount of developed silver |
|---|---|---|
| 1 | 0 | 100 |
| 2 | 100 | 0 |
| 3 | 0 | 1 |
| 4 | 98 | 99 |
| 5 | 94 | 12 |
| 6 | 97 | 98 |
| 7 | 92 | 16 |
| 8 | 98 | 99 |
| 9 | 94 | 12 |
| 10 | 97 | 98 |
| 11 | 92 | 16 |

In the comparative experiment 1, in which only the developing process is applied, the image information is difficultly obtained by reading by the scanner since the transmission density is considerably lowered by the presence of remained developed silver and silver halide, and a good image cannot be obtained even when a suitable image processing is applied.

In the comparative experiment 2, the image is good. However, the simpleness and rapidity of the processing is insufficient since the four processes requiring 8 minutes and 20 seconds in total, namely color development, bleaching, bleach-fixing and washing, are necessary.

In the comparative experiment 3, the reading is carried out after the bleaching process. Accordingly developed silver is removed and silver halide is remained in the light-sensitive material at the moment of reading-out. In such the case, although the reading-out by the scanner is possible, the image quality is insufficient since the transmission density is lowered and an unevenness of the image density caused by remained silver halide is formed.

In the experiments 4 through 7, in which the light-sensitive material is read after color development without bleaching process, the unevenness of the image caused by silver halide is dissolved. A high quality image can be obtained when the developing time is shortened to not more than 180 seconds since the load for reading-out on the scanner is reduced. Furthermore, the processing is considerably simplified and a rapidity of the processing is realized since the drying process is omitted. In experiments 8 to 11 each including the drying process, a degradation in the graininess of the image is observed compared to experiments 4 to 7, additionally the prolongation of the processing time.

It is realized by the invention that a quality image having no unevenness can be simply and rapidly obtained by reading-out image information in a wetted state after color developing without drying process while at least a part of developed silver is remained.

Example 2

Sample 2 was prepared in the same manner as Sample 1 in Example 1 except that the compositions of the coating solution of each of the layers are changed as follows:

First layer: Antihalation layer

The same as in Sample 1
Second layer: Interlayer

The same as in Sample 1
Third layer: Low-speed red-sensitive layer

| | |
|---|---|
| Silver iodobromide emulsion A | 0.63 |
| Sensitizing dye (SD-1) | $1.7 \times 10^{-4}$ |
| Sensitizing dye (SD-2) | $1.5 \times 10^{-4}$ |
| Sensitizing dye (SD-3) | $1.5 \times 10^{-4}$ |
| Sensitizing dye (SD-4) | $1.3 \times 10^{-5}$ |
| Cyan coupler (C-3) | 0.25 |
| Color developing agent D-18 | 0.31 |
| High-boiling solvent (Oil-1) | 0.28 |
| Gelatin | 2.05 |

Fourth layer: Medium-speed red-sensitive layer

| | |
|---|---|
| Silver iodobromide emulsion B | 0.71 |
| Sensitizing dye (SD-2) | $2.5 \times 10^{-4}$ |
| Sensitizing dye (SD-3) | $1.4 \times 10^{-5}$ |
| Sensitizing dye (SD-4) | $2.2 \times 10^{-4}$ |
| Cyan coupler (C-3) | 0.08 |
| Color developing agent D-18 | 0.10 |
| High-boiling solvent (Oil-1) | 0.09 |
| Gelatin | 0.83 |

Fifth layer: High-speed red-sensitive layer

| | |
|---|---|
| Silver iodobromide emulsion C | 1.52 |
| Sensitizing dye (SD-2) | $2.1 \times 10^{-4}$ |
| Sensitizing dye (SD-3) | $1.2 \times 10^{-5}$ |
| Sensitizing dye (SD-4) | $1.8 \times 10^{-4}$ |
| Cyan coupler (C-3) | 0.08 |
| Color developing agent D-18 | 0.10 |
| High-boiling solvent (Oil-1) | 0.09 |
| Gelatin | 1.04 |

Sixth layer: Inter layer

The same as in Sample 1
Seventh layer: Low-speed green sensitive layer

| | |
|---|---|
| Silver iodobromide emulsion A | 0.76 |
| Sensitizing dye (SD-1) | $6.5 \times 10^{-4}$ |
| Sensitizing dye (SD-9) | $7.2 \times 10^{-5}$ |
| Sensitizing dye (SD-7) | $7.5 \times 10^{-5}$ |
| Magenta coupler (M-3) | 0.20 |
| Color developing agent D-18 | 0.26 |
| High-boiling solvent (Oil-1) | 0.23 |
| Gelatin | 1.10 |

Eighth layer: Medium-speed green-sensitive layer

| | |
|---|---|
| Silver iodobromide emulsion B | 0.55 |
| Sensitizing dye (SD-1) | $5.2 \times 10^{-4}$ |
| Sensitizing dye (SD-9) | $5.8 \times 10^{-5}$ |
| Sensitizing dye (SD-7) | $5.0 \times 10^{-5}$ |
| Magenta coupler (M-3) | 0.10 |
| Color developing agent D-18 | 0.13 |
| High-boiling solvent (Oil-2) | 0.12 |
| Gelatin | 0.78 |

Ninth layer: High-speed green-sensitive layer

| | |
|---|---|
| Silver iodobromide emulsion C | 0.82 |
| Sensitizing dye (SD-6) | $1.4 \times 10^{-4}$ |
| Sensitizing dye (SD-7) | $1.5 \times 10^{-4}$ |

-continued

| | |
|---|---|
| Sensitizing dye (SD-8) | $1.4 \times 10^{-4}$ |
| Magenta coupler (M-3) | 0.10 |
| Color developing agent (D-18) | 0.13 |
| High-boiling solvent (Oil-2) | 0.12 |
| Gelatin | 0.91 |

Tenth layer: Interlayer

The same as in Sample 1
Eleventh layer: Yellow filter layer

The same as in Sample 1
Twelfth layer: Interlayer

The same as in Sample 1
Thirteenth layer: Low-speed blue-sensitive layer

| | |
|---|---|
| Silver iodobromide emulsion A | 0.16 |
| Silver iodobromide emulsion D | 0.16 |
| Sensitizing dye (SD-10) | $1.7 \times 10^{-4}$ |
| Sensitizing dye (SD-11) | $4.0 \times 10^{-4}$ |
| Sensitizing dye (SD'-1) | $3.1 \times 10^{-6}$ |
| Yellow coupler (Y-3) | 0.31 |
| Color developing agent (D-18) | 0.31 |
| High-boiling solvent (Oil-2) | 0.31 |
| Gelatin | 1.19 |

Fourteenth layer: Medium-speed blue-sensitive layer

| | |
|---|---|
| Silver iodobromide emulsion B | 0.46 |
| Sensitizing dye (SD-10) | $1.3 \times 10^{-4}$ |
| Sensitizing dye (SD-11) | $3.0 \times 10^{-4}$ |
| Sensitizing dye (SD'-1) | $1.6 \times 10^{-6}$ |
| Yellow coupler (Y-3) | 0.10 |
| Color developing agent (D-18) | 0.10 |
| High-boiling solvent (Oil-2) | 0.10 |
| Gelatin | 0.84 |

Fifteenth layer: High-speed blue-sensitive layer

| | |
|---|---|
| Silver iodobromide emulsion E | 0.41 |
| Sensitizing dye (SD-10) | $0.9 \times 10^{-4}$ |
| Sensitizing dye (SD-12) | $2.0 \times 10^{-4}$ |
| Sensitizing dye (SD'-1) | $1.0 \times 10^{-6}$ |
| Yellow coupler (Y-3) | 0.10 |
| Color developing agent (D-18) | 0.10 |
| High-boiling solvent (Oil-2) | 0.10 |
| Gelatin | 0.97 |

Sixteenth layer: First protective layer

The same as in Sample 1
Seventeenth Layer: Second protective layer

The same as in Sample 1

The structures of the couplers used in Sample 2 are shown below.

Yellow coupler Y-3

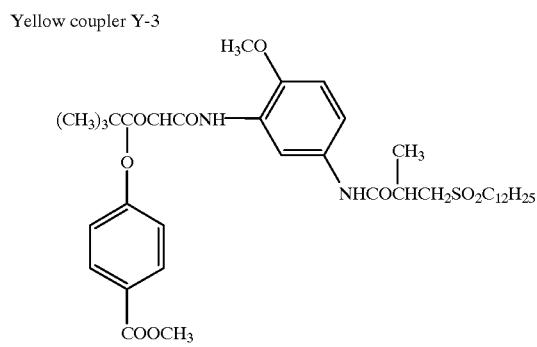

Magenta coupler M-3

Cyan coupler C-3

Thus prepared Sample 2 was slit and perforated in the format of 35 mm negative film. The film was put in a camera and a human and Macbeth Chart were photographed by the film. Then the film was processed by means of the following activator solution under the following conditions. The image information formed on the processed film was read out by a film scanner Q-scan manufactured by Konica Corp. The image information was processed by a personal computer and printed out by a printer PM-700C manufactured by Epson Co. Ltd. The printed image was visually evaluated and classified into four ranks in the same manner as in Example 1. The results thus obtained are shown in Table 4.

<Activator Solution>

| | |
|---|---|
| $Na_2CO_3$ | 26.5 g/l |
| $NaHCO_3$ | 6.3 g/l |
| $Na_2SO_3$ | 2.0 g/l |
| NaBr | 1.0 g/l |
| 4-hydroxymethyl-4-methyl-1-phenylpyrazolidine-3-one | 1.5 g/l |

Adjust pH to 12.5 with potassium hydroxide

<Stopping Solution>

| | |
|---|---|
| Acetic acid | 30 g |
| Water to make | 1 l |

Processing 8

| | | |
|---|---|---|
| Activating | 40° C. | 30 seconds |
| Washing | 40° C. | 30 seconds |
| Drying | 60° C. | 60 seconds |
| Total | | 2 minutes |

Processing 9

| Activating | 40° C. | 30 seconds |
|---|---|---|
| Total | | 30 seconds |

TABLE 4

| Experiment No. | Processing | Drying time | Total processing time | Graininess |
|---|---|---|---|---|
| 12 (Comparative) | 8 | 60 sec. | 2 min. | C |
| 13 (Inventive) | 9 | 0 | 30 sec. | A |

According to the invention, the processing can be considerably simplified and the processing time can be shortened since the drying process is omitted. Moreover a high quality image and formation of unevenness of image and precipatation of salts on the surface of the light-sensitive material caused by drying were inhibited by reading out the image formation while the light-sensitive material is wetted.

What is claimed is:

1. An image information recording method comprising the steps of imagewise exposing to light a silver halide photographic light-sensitive material comprising a support having thereon a light sensitive layer comprising silver halide and coupler, applying a developing solution to the imagewise exposed silver halide photographic light-sensitive material so that an image information is formed on the silver halide photographic light-sensitive material, removing a least 50% of the silver halide from the silver halide photographic light-sensitive material, converting the image information formed on the silver halide photographic light sensitive material to electric image information while the silver halide photographic light-sensitive material is wet and at least a part of developed silver remains in the silver halide photographic light-sensitive material, and recording the electric image information on a recording medium as electric image information.

2. The image information recording method of claim 1, wherein the method comprises no bleaching step.

3. The image information recording method of claim 1, wherein said applying step is performed for not more than 180 seconds.

4. The image information recording method of claim 1, wherein said silver halide photographic light-sensitive material in the wetted state comprises water or a processing solution in a weight ratio of from 0.1 to 1 times of water or of the processing solution to the silver halide photographic light-sensitive material.

5. The image information recording method of claim 1, wherein the silver halide of the silver halide photographic light-sensitive material is to be removed by 90% or more at the step of removing.

* * * * *